Jan. 16, 1968
N. B. MURPHY
3,363,480
AUTOMATIC THROTTLE CONTROL MECHANISM
Filed Oct. 23, 1965
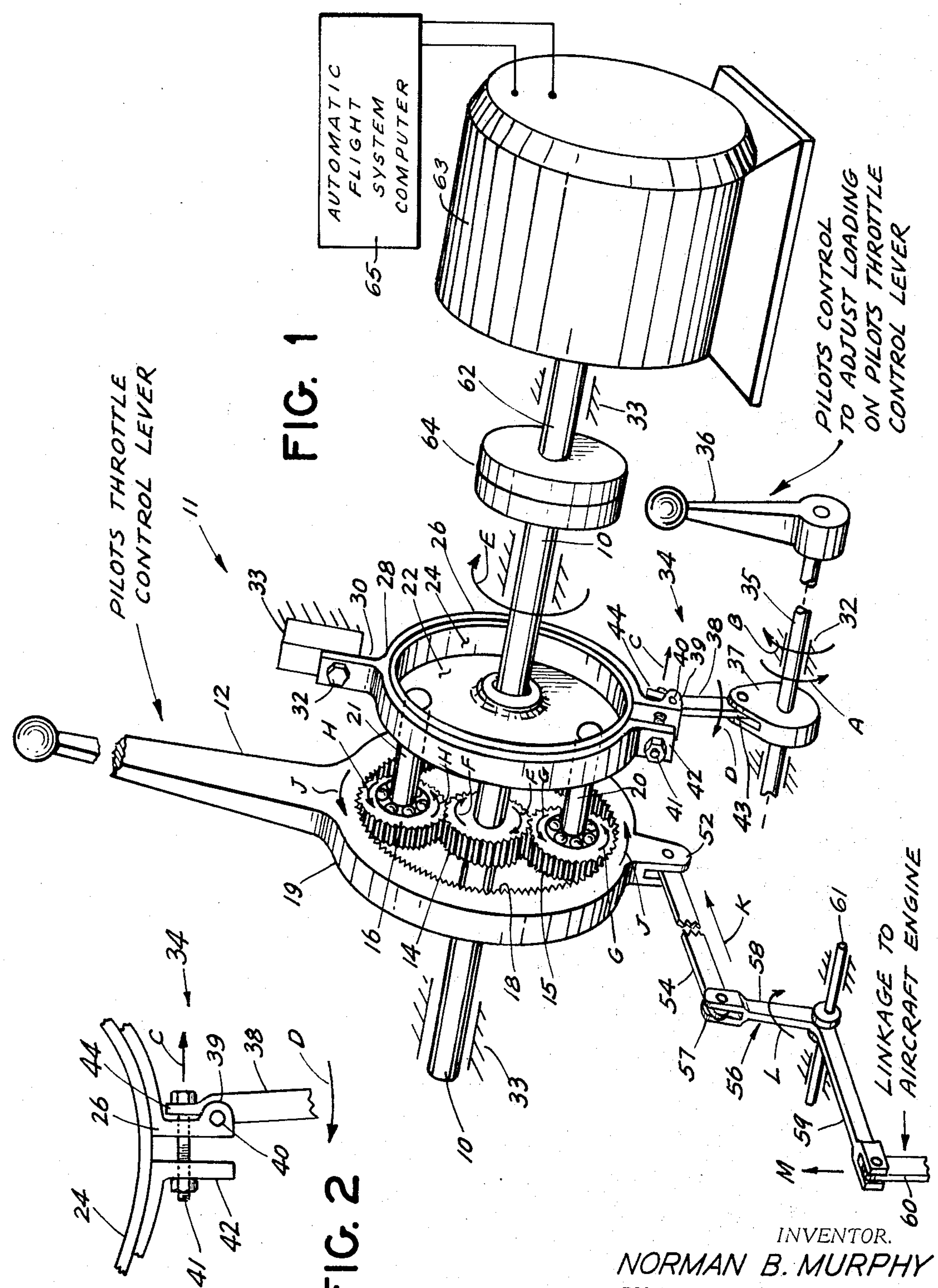
INVENTOR.
NORMAN B. MURPHY
BY
Constantine A. Michalos
ATTORNEY

United States Patent Office 3,363,480
Patented Jan. 16, 1968

3,363,480

AUTOMATIC THROTTLE CONTROL MECHANISM

Norman B. Murphy, Upper Saddle River, N.J., assignor to The Bendix Corporation, a corporation of Delaware Filed Oct. 23, 1965, Ser. No. 502,871
2 Claims. (Cl. 74—626)

ABSTRACT OF THE DISCLOSURE

Automatic control apparatus to selectively transmit torque through a gear arrangement from one or another driving sources to an engine throttle mechanism wherein one of the driving sources is hand operated and affected by a friction load applying means and the other driving source is electrically operated and independent of the friction load applying means.

This invention relates to automatic control of aircraft and more particularly to an automatic control of an engine power throttle lever mechanism responsive to a signal emanating from a flight system computer with a pilot's throttle control lever affected by a preset friction load and a servo motor which is independent of the drag produced by the friction load.

In the automatic control of vehicles such as modern aircraft, it is a general practice to utilize automatic control to control engine power throttle or throttles in response to signals emanatnig from an automatic flight system computer.

This invention provides for a simple mechanical implementation of the function generally referred to as a throttle control whereby a servo actuator is employed to actuate one or more throttle levers.

The throttle levers, which the pilot may advance or retard in order to gain a particular power setting, are generally provided with a fuel or friction load which prevents movement of the individual levers from their "set" position due to aircraft vibration or loads from other sources. In some aircraft, this friction value is predetermined and preset through a slip clutch or similar device in the pedestal. In other systems, the pilot is provided with an additional lever or wheel by which he can increase or decrease the feel or loading on the throttle levers to suit his particular desires.

It therefore becomes apparent that in order that the throttles are controlled through a servo system, a wide range of loads may be encountered unless some means is provided whereby this feel or friction is removed at the time automatic control is initiated. Interlocks, to prevent engagement of the throttle system until friction is removed, or a device to automatically accomplish this feature further complicates this system which introduces possible hazards.

Therefore, an object of this invention is to provide an automatic control system for the throttle levers which is independent of friction loading that can be applied at the pedestal either as a present value or as a variable value set by the pilot.

Another object of this invention is to provide an automatic throttle control system for an aircraft which is independent of friction loading applied and which does not interfere with the existing throttle linkage or cabling wherein any secondary members used for control become a part of the primary system.

A further object of this invention is to provide an improved apparatus which may be implemented as part of the throttle mechanism within the pedestal.

Still another object of this invention is to automatically control the throttle levers independent of friction loading that may be applied for the manual operation and to provide this apparatus as part of the throttle mechanism which can be installed as a separate packaged device mounted at a convenient point below the pedestal such that it may be coupled in parallel to the existing throttle system.

An additional object of this invention is to provide an automatic control system for the throttle levers which is independent of any preset friction drag applied for the manual control and which throttle is part of a plurality of throttles which can be implemented in a similar manner with the other throttles and driven by a common shaft.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawing:

FIGURE 1 is a perspective view of an automatic and manual throttle control mechanism in accordance with a preferred embodiment of this invention; and, FIGURE 2 is an end view of a detailed fragmentary portion of the device shown in FIGURE 1.

Referring to FIGURE 1 of the drawing, there is shown a center shaft 10 on which is mounted a plurality of automatic-manual engine power throttle lever mechanisms, such as lever mechanism 11, comprised of a pilot's throttle control lever arm 12, a sun gear 14 engaging two opposed planetary gears 15 and 16 and which in turn engage an internal ring gear 18 fitted to the inside of a circular portion 19 of the lever arm 12. Planetary gears 15 and 16 are supported for rotation about shafts 20 and 21 respectively, which in turn project from a suitable yoke or flange portion 22 formed integral with a brake drum 24. The flange portion 22 of the brake drum 24 is free to rotate about the shaft 10 and the gears 15 and 16 are free to rotate about their shafts 20 and 21, respectively, carried by the flange portion 22.

Shown in FIGURE 1 of the drawing is a brake band 26 which encircles the brake drum 24. The brake band 26 is held at its central portion 28 by an integral protrusion 30 extending radially outwardly from the brake band's circumference. The protrusion 30 is secured by a bolt 32 to a portion of a frame 33.

As shown in FIGURES 1 and 2, the attachment of the brake band 26 to the frame 33 is so arranged that the brake band 26 may be tightened through an adjustment shaft and linkage system 34 to thereby provide varying friction loads. In detail, the adjustment shaft and linkage system 34 comprises an adjustment shaft 35 which may be angularly adjusted by positioning a pilot control lever 36 in one sense, as indicated by an arrow A, to increase the loading between the brake drum 24 and brake band 26, and in an opposite sense as indicated by an arrow B to decrease the loading between brake drum 24 and brake band 26. The angular adjustment of the shaft 35 effects a corresponding angular adjustment of a link 37 in counterclockwise or clockwise senses. A link 38 pivotally connects the link 37 to an end or ear 39 of the brake band 26 so that a counterclockwise adjustment of the link 37 in the direction of the arrow A, causes the link 38 to pivot about a point 40 in a clockwise direction as indicated by arrow D to pull a bolt and nut arrangement 41 towards the right as shown by arrow C in both figures. That is, pivot point 40 is located on the extreme end of the lug 39, as best shown in FIGURE 2, for pivotal rotation of the link 38 about the pivot point 40. When the direction of rotation of the link 38 is shown by the arrow D, the bolt and nut arrangement 41 will bring the lug 40 together with another end or lug 42 of the brake band 26. More specifically, as best shown in FIGURE 2, the link 38 is pivotally mounted at the pivot point 40 on the ear 39 at one end of the brake band 26. As shown in FIGURE 1, one end 43 of the link 38 is pivotally connected to the link 37 while an opposite end 44 of the link 38, as shown in FIGURE 2, is drivingly connected to the head of the bolt and nut arrangement 41 which projects through the ear 39 and through the end 44 of the link 38. The bolt and nut arrangement 41 also projects through the ear 42 of the brake band 26, as best shown in FIGURE 2, to be secured by the nut of the bolt and nut arrangement 41. In this manner the friction load between the brake drum 24 and the brake band 26 may be increased by rotating the shaft 35 in a counterclockwise direction, as viewed in FIGURE 1 and as shown by the arrow A, and the friction force between the brake drum 24 and brake band 26 may be decreased by rotating the shaft 35 in the opposite direction, as shown by the arrow B.

Further as shown by the drawing, attached to the diameter of the circular portion 19 of the lever arm 12, diametrically opposite to the lever arm 12, is an arm 52 which in turn has pivotally attached at one end a link 54 which in turn is attached to a bell crank 56 at one end 57 of its leg portions 58. The other leg portion 59 of the bell crank 56 is attached to another link 60 which connects to a suitable control for the engine of the aircraft (not shown). The bell crank 56 pivots about an axle 61, which is supported by the frame 33, to move the link 60 up or down depending on the rotation of the bell crank 56.

In the automatic operation of the system the shaft 10 is coupled to a shaft 62 of a throttle servo motor 63 through a suitable clutch system 64. The servo motor 63 is automatically controlled by electrical signals emanating from an automatic flight system computer 65 which may be of a conventional type well known in the art. When the shaft 62 is rotated by the throttle servo 63 to rotate the shaft 10 in a clockwise direction, as viewed in the drawing and as shown by arrow E, it will rotate the sun gear 14 in the same clockwise direction as shown by arrows F. The sun gear 14 in turn will impact a counterclockwise rotation to the planetary gears 15 and 16, about their respective shafts 20 and 21, as shown by arrows G and H respectively to impart a counterclockwise rotation to the ring gear 18, as shown by arrows J, to move the lever arm 12 counterclockwise. The displacement of the throttle lever arm 12 through the planetary gears 15 and 16 will thereby move the aircraft linkage 54 in a direction as shown by arrow K to rotate the bell crank 56 clockwise as shown by arrow L and thus move the linkage 60 in the direction shown by arrow M for the actuation of the control of the aircraft engine.

It should be noted that the rotation of shaft 10 by throttle servo motor 63 is not effected by the friction loading on the brake drum 24 because the brake drum does not move when the servo motor 63 actuates the throttle system. The friction load on the brake drum 24 provides the reactive forces which maintains the position of the yoke or flange 22 to allow the planetary gears 15 and 16 to rotate about their shafts 20 and 21 and to operate as a spur gear train with the sun gear 14 and ring gear 18.

In addition it should be noted that the throttle servo motor 63 can not be rotated by an external source, such as by the lever arm 12. Therefore if the pilot wishes to manually overpower any one or all of the engine control mechanisms, such as the mechanism 11, the sun gear 14 will remain in a fixed position, held by the servo motor 63, and the planetary gears 15 and 16 will be forced to rotate around the sun gear 14 and thereby cause rotation of the brake drum 24 against the friction force applied by the brake band 26.

The advantage of this system is that the overpowering force required is the same friction force that was preset by the pilot by the pilot's control 36 through the shaft 35, and the same friction force that he would encounter should the pilot wish to move the throttles during manual flight conditions.

The clutch 64, used to couple the shaft 10 to the shaft 62 of the throttle servo motor 63, may be of a simple splined coupling or it may be a slip clutch if additional safety provisions are required. It should be noted that the shaft 62, of the servo motor 63, and the shaft 10 coupling may also be coupled by any other positive coupling means.

In summary, as explained hereinbefore and as shown in the drawing, it will be noted that his automatic control system may be used to best advantage and would be least complicated when included as part of an aircraft control system incorporated into the pedestal. To be incorporated into existing systems, where it is more practical to provide a separate mechanism in parallel, the apparatus disclosed can be adapted with minor aircraft modifications. For example, a separate system can be built containing the hereinbefore described mechanism except that the throttle lever 12 would be replaced by a pulley or an arm which could be connected to the aircraft's existing control cable or linkage at a convenient position. The friction adjustment shaft 35 would be attached to an existing pilot's control 36 used for applying friction to the throttles except that the friction device itself built into the aircraft throttle shaft would be replaced by the friction drums in the automatic throttle control unit.

It should be noted that the friction device shown in the drawing is schematic and represents but one means of applying necessary loads. An internal expansion type of brake or multiple disc type of brake could be substituted if dictated by the final configuration of the system.

It should also be noted that the only limitation to friction loads that can be applied by the pilot is the low limit load since the friction load on the brake drum as noted previously must be sufficient for the servo motor 63 to drive the throttle system without slippage.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An automatic throttle control system to control engine power, said system comprising: a servo motor, a sun gear connecting said servo motor for rotation in one or the other sense, planetary gear engaging said sun gear for rotation of said planetary gear by said sun gear, a ring gear engaging said planetary gear, a throttle control lever arm operably connected to said ring gear for movement therewith, a friction load applying means operably connected to said planetary gear whereby said lever arm may be rotated for overcoming the applied friction load and for producing a rotation of the above mentioned gears as a gear train to control the engine power while said servo motor is not affected by the friction load applied by said friction load applying means, said friction load applying means including a brake drum, a brake band encircling said brake drum, adjustment means for urging said brake band onto said brake drum for applying a varying friction load therebetween, and wherein said planetary gear further comprises a shaft, said brake drum being rotatable relative to said shaft, said shaft being roatable for providing a rotation of the planetary gear about said shaft effected by the restraint of the friction load applied by said brake band, said brake band including a pair of ends, a pair of lugs extending radially outwardly of said ends, fastening means interconnecting said lugs, a link pivotal about the external end portions of one lug and engaging said fastening means at one extended portion, and means for rotating said last mentioned link in one sense to produce a pull on said fastening means to move said lugs together for increasing the friction load between said brake drum and said brake band, and for rotating in the other sense to release the friction load between said brake drum and said brake band.

2. An apparatus to selectively operate a control mechanism, said apparatus comprising a servo motor, a center shaft rotatable by said servo motor in one or another sense, a sun gear coaxial to and supported by said center shaft, a pair of opposed planetary gears operably rotatable by said sun gear, an internal ring gear engaging said pair of opposed planetary gears, a lever arm integral to said ring gear for rotation with said ring gear, shafts supporting each planetary gear for rotation, a brake drum including means supporting said last mentioned shafts, a brake band encircling said brake drum, and adjustment means for applying friction between said brake band and said drum wherein when said servo motor is rotated, said first sun gear operates said planetary gears for rotating said ring gear and move the lever arm while the friction load between said brake drum and said brake band restrains the planetary gears for rotation only about their shafts for movement of said lever to operate said control mechanism and wherein when said lever arm is rotated manually, said servo motor restrains the rotation of said sun gear to move the planetary gears about said sun gear to manually move said control mechanism against the friction load.

References Cited

UNITED STATES PATENTS

| | | | |
|---|---|---|---|
| 2,238,739 | 4/1941 | Jarvis | 74—626 X |
| 2,394,384 | 2/1946 | Horstmann | 74—480 |
| 2,420,552 | 5/1947 | Morrill | 74—626 |
| 2,881,635 | 4/1959 | Green. | |
| 2,997,895 | 8/1961 | White | 74—626 |
| 3,312,121 | 4/1967 | Lewis | 74—480 |

FOREIGN PATENTS

| | | |
|---|---|---|
| 631,830 | 11/1949 | Great Britain. |

FRED C. MATTERN, Jr., *Primary Examiner.*

W. S. RATLIFF, *Assistant Examiner.*